United States Patent [19]

Hoaglin et al.

[11] 4,219,370

[45] Aug. 26, 1980

[54] APPARATUS AND METHOD FOR CUTTING AND BEVELING PIPE ENDS

[75] Inventors: Harold B. Hoaglin, Sylacauga; James R. Grill, Birmingham; Jack H. Keller, Cullman, all of Ala.

[73] Assignee: Chicago Bridge & Iron Company, Oak Brook, Ill.

[21] Appl. No.: 13,518

[22] Filed: Feb. 21, 1979

[51] Int. Cl.$^2$ ............................................. B23K 26/00
[52] U.S. Cl. ...................................... 148/9.6; 266/57; 266/61; 266/62; 266/64
[58] Field of Search ...................... 266/57, 61, 62, 64; 148/9.6

[56] References Cited

U.S. PATENT DOCUMENTS

| | | | |
|---|---|---|---|
| 3,409,282 | 11/1968 | Livers | 266/56 |
| 3,430,938 | 10/1966 | Blackburn | 266/57 |
| 3,608,246 | 9/1971 | McCormack et al. | 51/135 R |
| 3,614,077 | 10/1971 | Blackburn | 266/57 |
| 3,790,144 | 2/1974 | Waldron | 266/57 |
| 4,052,039 | 10/1977 | Koyano et al. | 266/57 |
| 4,143,862 | 3/1979 | Krieg | 266/56 |
| 4,148,467 | 4/1979 | Sargeant | 266/57 |

Primary Examiner—L. Dewayne Rutledge
Assistant Examiner—John P. Sheehan
Attorney, Agent, or Firm—Merriam, Marshall & Bicknell

[57] ABSTRACT

Apparatus for cutting a pipe end for intersection with another surface comprising a horizontally positioned and movable boom, roller means to support and axially rotate a horizontal pipe parallel to the boom, a photocell scanner mounted on the boom and positioned to follow a template circumscribing a pipe on the roller means, drive means responsive to a signal from the photocell scanner, adapted to move the boom horizontally in either axial direction as the photocell scanner follows the template, and a cutting torch movably supported by a mounting on the boom and positioned to cut through a pipe, rotating axially on the roller means, in a cutting path having the same contour as the template.

A method of cutting the end of a pipe for intersection with another surface, comprising placing the pipe on roller means to support and axially rotate it horizontally and parallel to a horizontally positioned and movable boom having a cutting torch movably supported by a mounting on the boom and a photocell scanner spaced from the torch, placing a template which is readable by the photocell scanner on and at least partially circumscribing the pipe, activating the roller means to rotate the pipe, and automatically moving the boom horizontally and axially responsive to the photocell scanner tracing the template and simultaneously cutting the pipe with the torch in a path which is controlled by the template.

10 Claims, 13 Drawing Figures

U.S. Patent Aug. 26, 1980 Sheet 1 of 4 4,219,370
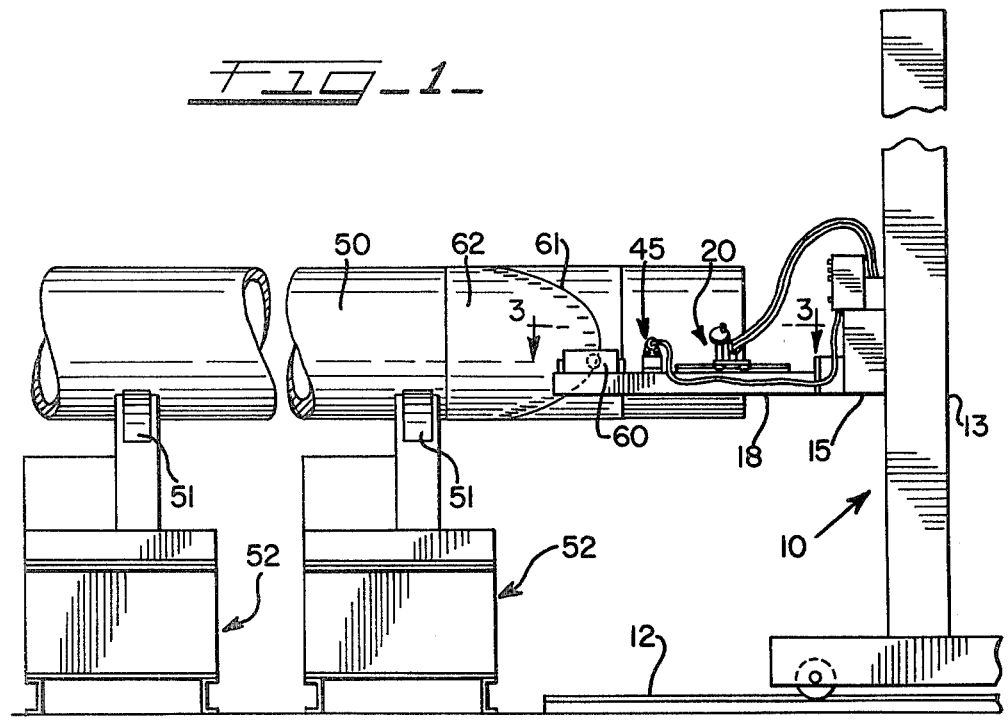
Fig_1_
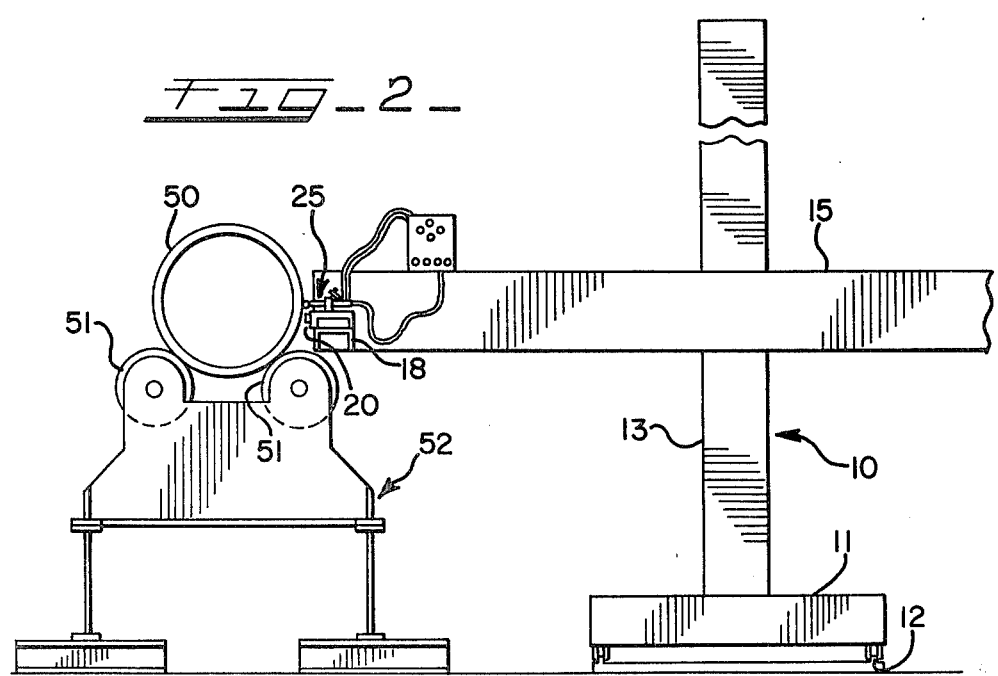
Fig_2_

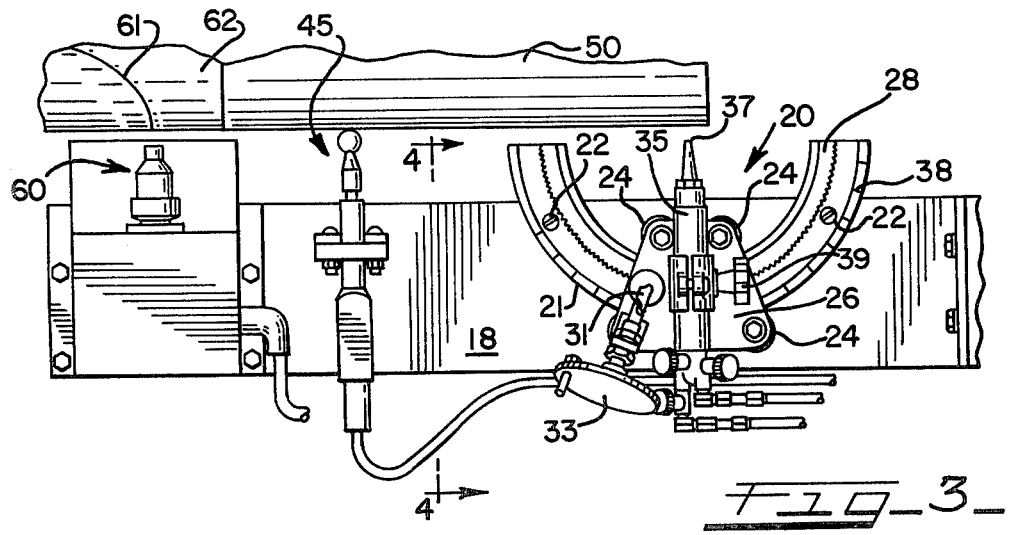
FIG_3
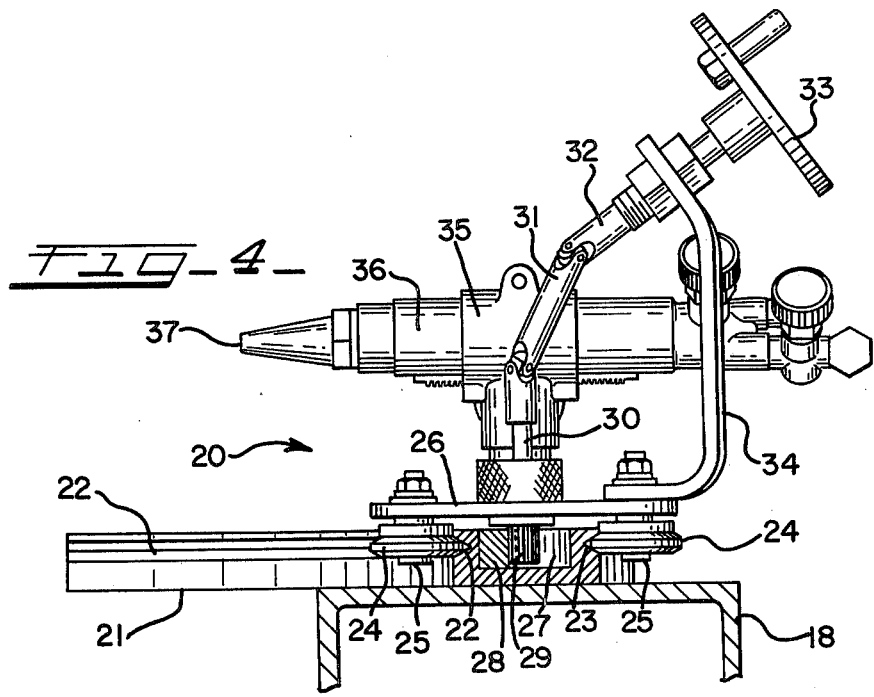
FIG_4

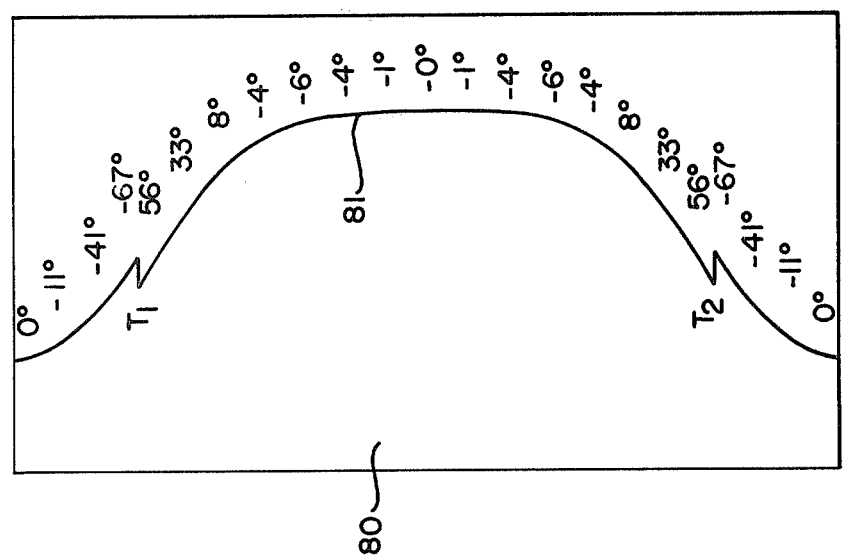
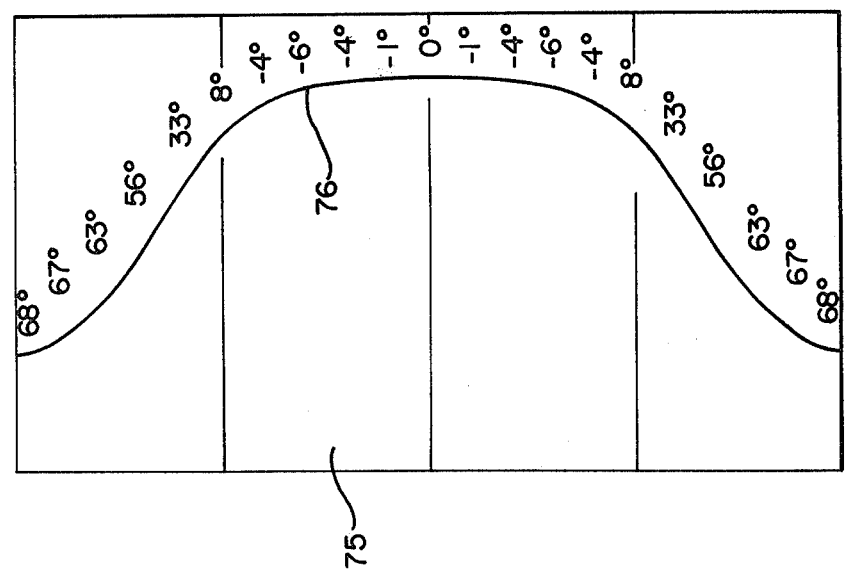

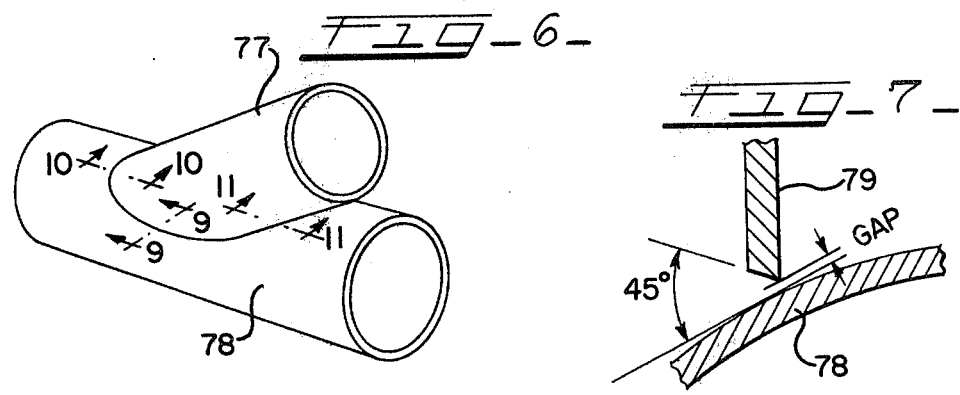
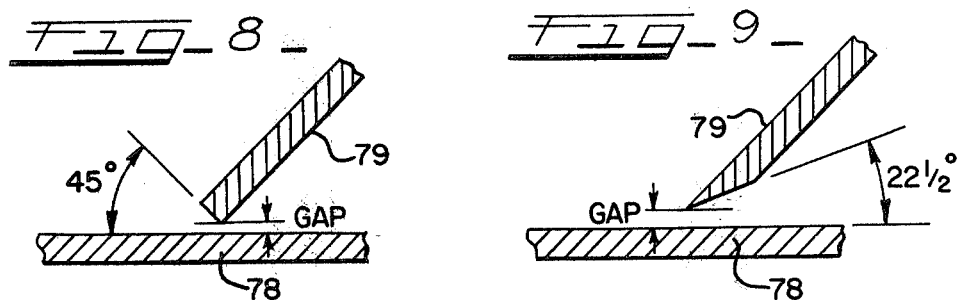
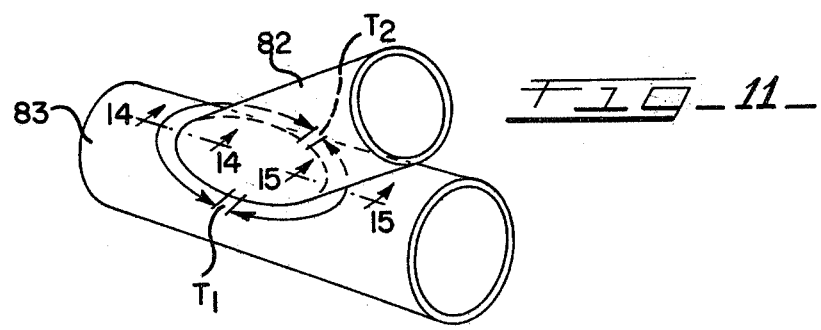
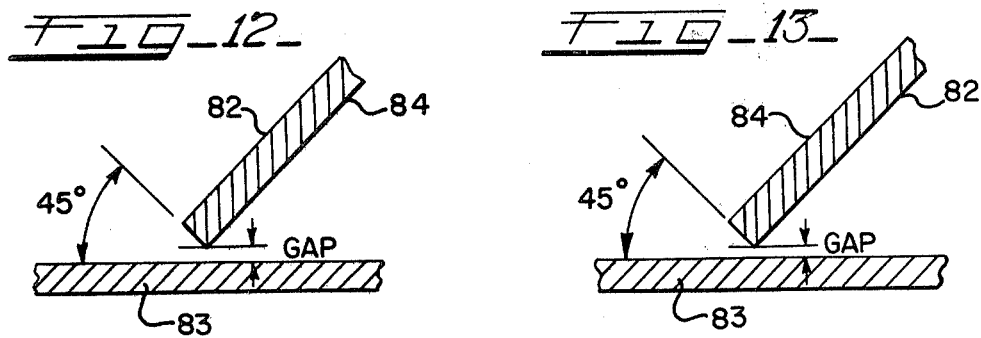

APPARATUS AND METHOD FOR CUTTING AND BEVELING PIPE ENDS

This invention relates to apparatus and methods for cutting shapes. More particularly, this invention is concerned with apparatus and methods for cutting pipe to provide a pipe end having a contour or profile with a suitable bevel for welding at an angle to another pipe or surface.

BACKGROUND OF THE INVENTION

1. Field of the Invention

Many large structures and related facilities which are built require the use of large size pipe. While joining such pipes axially by welding is not particularly difficult, it is sometimes necessary for such pipes to intersect other pipes, of the same or larger size, at an angle, in most cases from about 30° to 90°, and to be joined by welding. Offshore towers for oil and gas exploration and production are quite often made of large size pipe with pipe used for the legs and braces, both lateral and otherwise angled, between the legs. The ends of the pipe braces are contoured or profiled to fit very closely against the surface of the legs and other surfaces to facilitate fabrication of a strong, economical welded joint. Unless the pipe brace end fits close to the leg, or some other surface to which it is to be joined, an excessive deposit of weld metal will be needed to complete the joint, thus increasing costs, fabrication time and the chance for a faulty weld.

It is not possible to standardize on an intersecting pipe end profile or contour because the intersected or trunk pipe and the intersecting or branch pipe for different structures can vary in diameter and thickness, whether they are of the same or different diameters and thicknesses, and the angle of intersection can also vary. These variables inherently change the intersecting pipe end profile. A further factor is involved because the intersecting or branch pipe wall thickness affects the bevel desired for welding the joint.

2. Description of the Prior Art

Pipe Beveling Machine Co., Inc., Tulsa, Okla., offers commercially an intersectional pipe cutting apparatus represented as related to U.S. Pat. No. 3,409,282. The apparatus of the patent rotates on a ring gear around a pipe to be cut. The torch also rotates about the pipe and cuts a contour corresponding with a template edge which surrounds the pipe. The torch cuts the pipe wall laterally or at a fixed bevel. This apparatus lacks flexibility because separate ring gears are needed for each narrow range of pipe diameters and because a separate metal template is required for each different intersecting contour.

Vernon Tool Company, Alhambra, Calif., has U.S. Pat. Nos. 3,430,938 and 3,614,077 on pipe cutting and handling apparatus. U.S. Pat. No. 3,430,938 discloses a geometric mechanism for torch cutting a contour on a rotating pipe. As the pipe rotates, a cam synchronized therewith drives an adjustable crank which moves a cutting torch support axially of the pipe to cut the contour. Such apparatus requires adjustment of the crank with change in pipe diameter and/or angle of intersection to obtain the desired pipe end contour. Also, variable pipe wall bevels are not producible with the apparatus.

SUMMARY OF THE INVENTION

According to one aspect of the invention, there is provided an apparatus comprising in combination, a horizontally positioned and movable boom, roller means to support and axially rotate a horizontal pipe parallel to the boom, a photocell scanner mounted on the boom and positioned to follow a template circumscribing a pipe on the roller means, drive means responsive to a signal from the scanner adapted to move the boom horizontally in either axial direction as the scanner follows the template and a cutting mechanism movably supported by a mounting on the boom and positioned to cut through a pipe rotating axially on the roller means in a cutting path having the same contour as the template line.

The roller means desirably includes a drive system to rotate a pipe supported by the roller means. The drive system for the roller means and the drive means for the boom are advantageously synchronized to obtain relatively uniform linear movement of the torch along its pipe cutting path. Also, the roller means desirably is controllable as to the speed at which it rotates a pipe supported thereon independently of the boom horizontal speed and vice versa. The electrical apparatus for effecting such drive means is commercially available and not part of this invention.

The cutting mechanism is desirably a torch suitably mounted to cut the pipe. The torch mounting will generally include means to move the torch and scanner longitudinally toward and away from a pipe, thereby maintaining a constant flame impingement distance from the pipe regardless of the torch position or angle, as governed by the template, relative to the pipe. The torch mounting desirably is provided with means to rotate the torch from a position lateral to the axis of a pipe on the roller means through an angle of at least 65° on each side of the lateral position. The torch mounting can include a protractor to measure the torch angle from a position lateral to a pipe on the rollers. The means to rotate the torch can be manually operable or it can be made automatically operable with rotation of the pipe.

According to a second aspect of the invention there is provided a method of cutting the end of a pipe for intersection with another surface such as one curved in at least one direction, such as a second pipe, comprising placing a pipe on roller means to support and axially rotate it horizontally and parallel to a horizontally positioned and movable boom having a cutting torch movably supported by a mounting on the boom and a photocell scanner spaced from the torch, placing a template means which is readable by the scanner on and at least partially circumscribing the pipe, activating the roller means to rotate the pipe and automatically moving the boom horizontally and axially responsive to the scanner tracing the template and simultaneously cutting the pipe with the torch in a path which is controlled by the template.

The end of the pipe can be beveled as the pipe rotates by rotating the torch within an angle of about 25° to 155° with respect to the pipe axis as the pipe rotates. The torch is desirably guided to cut the pipe end so that it can contact the other surface, such as a second pipe, approximately along the inside or outside edge of the end of the pipe wall as is appropriate to provide a bevel for depositing the weld.

The proper angle of bevel can be cut by having the torch mounting include a protractor to measure the torch angle from a position lateral to the pipe, spotting angle degree markings around the template means and adjacent the template, and rotating the torch to angles corresponding with the angle degree markings as the pipe rotates and the torch cuts the pipe. In addition, if desired, the proper angle of bevel can be cut by having the torch mounting motorized and controlled by a second photocell scanner which follows a second template means.

BRIEF DESCRIPTION OF THE DRAWINGS

FIG. 1 is a front elevational view of the cutting torch support apparatus positioned to cut a pipe rotatably supported on rollers;

FIG. 2 is an end elevational view of the same apparatus shown in FIG. 1;

FIG. 3 is a plan view taken along the line 3—3 of FIG. 1 and shows the horizontal boom forming part of the apparatus with a photocell scanner, probe and cutting torch supported thereon;

FIG. 4 is a vertical sectional view taken along the line 4—4 of FIG. 3 and shows a cutting torch mounting for rotating the torch.

FIG. 5 illustrates a paper template, which is wrapped around a pipe to be cut, containing a line followed by a photocell scanner to control the profile cut on a pipe;

FIG. 6 is an isometric view of a branch pipe cut to intersect a trunk pipe using the template of FIG. 5;

FIG. 7 is a sectional view taken along the line 11—11 of FIG. 6;

FIG. 8 is a sectional view taken along the line 12—12 of FIG. 6;

FIG. 9 is a sectional view taken along the line 13—13 of FIG. 6;

FIG. 10 illustrates a second paper template having a guide line which the photocell scanner can follow;

FIG. 11 is an isometric view of a branch pipe cut to intersect a trunk pipe using the template of FIG. 10;

FIG. 12 is a sectional view taken along the line 16—16 of FIG. 11; and

FIG. 13 is a sectional view taken along the line 17—17 of FIG. 11.

DETAILED DESCRIPTION OF THE DRAWINGS

The same numbers will be used to identify the same or similar parts or elements in the various views of the drawings to the extent this is practical.

With reference to FIGS. 1 and 2, a commercially available welding positioning and manipulator unit 10 is used as the basic structure to support and move the cutting torch and related equipment as will be subsequently described. The manipulator 10, available from Pandjiris, St. Louis, Mo., has a wheeled car 11 which rolls on tracks 12 positioned parallel to the axis of the pipe to be cut. Post 13 is vertically and stationarily positioned on car 11. Arm 15 is mounted horizontally on post 13. Arm 15 is vertically displaceable up or down while horizontally positioned and it is also laterally movable. Extending laterally from one end of arm 15 is horizontal boom 18.

Mounted on horizontal boom 18 is the cutting torch assembly 20, probe 45 and photocell scanner 60 as shown in FIGS. 1 and 3.

A pipe 50 to be cut is rotatably positioned on the turning rolls 51 which are commercially available (Pandjiris) with a supporting framework 52 and drive mechanism. The turning rolls operate in pairs and at least one roll of one pair is drivable by suitable conventional means which permits axial rotation of the pipe 50 at an infinitely variable speed within a predetermined range.

As is shown in FIGS. 3 and 4, the cutting torch assembly 20 includes a semi-circular ring 21 which is detachably joined to the boom 15 by bolts 22. The ring 21 has external grooves 22 and 23 in which four rollers 24 are positioned. The four rollers 24 are mounted on vertical axles 25 joined to plate 26. A semi-circular channel 27 located in the top of semi-circular ring 21 contains a semi-circular ring gear 28 which occupies only about the radially inward one-half of the channel 27.

A spur gear 29 meshes with ring gear 28. The spur gear 29 is rotatably mounted beneath plate 26 on shaft 30. Shaft 30 is joined through a universal joint to shaft 31 which in turn is joined through a universal joint to shaft 32 having handle 33 on the upper end thereof. Bracket 34 is joined at the bottom to plate 26 and the upper end of the bracket rotatably supports shaft 32.

Extending upwardly from plate 26, to which it is joined, is clamping bracket 35 in which cutting torch 36 is slidably positioned to facilitate having the torch nozzle 37 positioned a suitable distance from a pipe to be cut.

Angle markings 38 in degrees are placed on the top edge of ring 21 with the 0° mark positioned to be on the edge 39 of plate 26 when the torch 36 is lateral or perpendicular to the axis of pipe 50. The degree markings are numbered in 5° increments, with increasing numbers located by the markings, extending both clockwise and counterclockwise from the 0° mark. Individual degrees are indicated by an engraved line. Markings in the clockwise direction from 0° are furthermore indicated to be plus (+) degrees to distinguish them from the degree markings counter-clockwise from 0° which are marked minus (−). Thus, the torch is pointed left for minus degrees and right for plus degrees. The torch is rotatable at least 65° in either direction by simple rotation of handle 33. Clockwise rotation of handle 33 moves the torch clockwise on the torch mounting assembly and rotation of handle 33 counterclockwise moves the torch counterclockwise. The cutting torch nozzle 37 is maintained a substantially constant distance away from pipe 50 as the torch is rotated thereby facilitating any angle of cut desired by having the flame impingement distance constant at all angles of cut.

A probe 45, also mounted on boom 18 as shown in FIGS. 1 and 3, upon sensing radial movement of pipe 50 towards or away from torch 35 activates a conventional drive mechanism causing arm 15 to move laterally towards or away from the pipe. In this way the torch nozzle is maintained a predetermined flame impingement distance away from pipe 50 even when pipe 50 is out of round. A commercially available probe 45, such as a Cecil probe, can be used for this purpose. McCormack et at. U.S. Pat. No. 3,608,246 discloses such a probe and its operation.

Also mounted on boom 18 is photocell scanner or electric eye 60 which is designed to follow a template line 61 on paper template 62 wrapped around pipe 50 (FIGS. 1 and 3), or to follow the edge of a silhouette. A suitable electric eye line tracer or photocell scanner device and control system is available from C & G Associates, Elk Grove Village, Ill. Stewart-Warner Electronics, Chicago, Ill. also supplies an optical tracing system which can be used to follow the template line. The X—Y coordinate drive systems of commercial cutting machines can be adapted to use in this invention. An X-coordinate drive system can be used to drive the boom 18 holding the torch and the Y-coordinate drive system can be used to drive the rolls 51 to rotate the pipe.

A template with a line or a silhouette edge thereon which can be used to cut a pipe to have an end with a profile or contour which closely matches the surface of a pipe or any other surface it intersects such as a spherical, flat, conical or other surface it intersects is readily made using known geometric mathematics. Such a template line, however, must take into account the fact that a pipe wall has thickness and that for effective welding the end of the pipe being cut must be beveled for proper deposition of weld metal.

FIG. 5 illustrates a template 75 and template line 76 for use in cutting the end of a four inch diameter branch pipe 77 intersecting a five inch diameter trunk pipe 78. Each pipe is one inch in thickness. FIGS. 6 to 9 illustrate the pipe connection and the bevels to be cut on the branch end while the template line is followed by the photocell scanner. In FIGS. 7 to 9, the inside surface of the branch pipe is designated 79. In this case the contact point of the branch pipe is always on the inside diameter of the branch pipe 77. A varying bevel is required to have room to deposit an equal amount of weld metal. The origin of the bevel is always on the inside of the pipe 77 and it is determined by the template line 76 of FIG. 5. The cutting torch is aimed from the outside of the pipe at the origin point on the inside and to do this the torch nozzle must be rotatable about a zero point as in the described torch mounting assembly.

To cut a four inch diameter pipe using the template of FIG. 5, the template is first placed around the pipe 77 already supported on rollers 51. The pipe is rotated until the photocell scanner 60 is at the 0° bevel angle adjacent the template line. The cutting torch is positioned at the 0° line so that it is lateral to the pipe axis. The cutting torch is ignited and then the pipe is rotated on rollers 51. As the pipe rotates the photocell scanner 60 follows the template line 76 thereby activating a drive mechanism to cause the boom to move axially parallel to pipe 77 in either direction. As the pipe rotates and the angle figures adjacent the template line shown in FIG. 5 come adjacent to the photocell scanner, the handle 33 is rotated to position the torch at an angle to the pipe corresponding to the angle designation by the template line. Plus (+) angles point the torch to the right and minus (−) angles to the left. Continual smooth adjustment of the torch angle to the pipe is made as cutting continues with pipe rotation until cutting is completed.

Pipe cutting as described provides highly accurate well-fitting pipe ends. Even out of roundness of the pipe does not significantly adversely affect the accuracy since the photocell scanner and cutting torch move axially to the pipe as a unit thereby maintaining a fixed distance. In this way the distance from the template line to the cutting path is kept constant because the photocell scanner precisely follows the template line. Even when the pipe moves axially on the rollers, as unintentionally but frequently happens, the cut is accurately made since the photocell scanner will follow the line while the distance between the photocell scanner and the cutting torch is constant.

FIG. 10 illustrates another template 80 having a template line 81 for cutting the end of a one inch thick, four inch diameter branch pipe 82 intersecting a trunk pipe 83 at 45°. With the use of this template the cutting torch cuts the pipe with a bevel having the point of contact moving from the inside diameter to the outside diameter. The point of contact is the point of origin for the bevel angle as is shown in FIGS. 11 to 13. With reference to FIG. 11 the point of contact moves from the inside of branch pipe 82 to the outside of the branch pipe within the transition areas $T_1$ and $T_2$ shown on the template line of FIG. 10 and in FIG. 11. The inside of the branch pipe is designated 84. The cutting torch must rotate from 0° to −67° in a cutting length of about 2 inches as measured along the curve and then move back to +56° in a ⅜" transition from inside to outside bevel.

Templates as described can be produced using a computer program to make a printout from which a plotter can print the template line far more accurately and many times faster than a template maker could produce them. In addition to a line template, an equivalent template is formed by a silhouette edge as when the edge of one material is placed on a contrasting material.

The described apparatus and method are particularly useful for cutting and beveling the end of a pipe which intersects a second pipe wall. However, the disclosed invention can also be used to cut a pipe end which intersects a flat surface, other single curved surfaces besides those which are cylindrical, as for example a conical surface, and double curved surfaces as exemplified by a spherical, elliptical or other domed surface.

The foregoing detailed description has been given for clearness of understanding only, and no unnecessary limitations should be understood therefrom as modifications will be obvious to those skilled in the art.

What is claimed is:

1. Apparatus in combination comprising:
 a horizontally positioned and movable boom,
 roller means to support and axially rotate a horizontal pipe parallel to the boom,
 a photocell scanner mounted on the boom and positioned to follow a template circumscribing a pipe on the roller means,
 drive means, responsive to a signal from the photocell scanner, adapted to move the boom horizontally in either axial direction as the photocell scanner follows the template,
 a cutting torch movably supported by a mounting on the boom and positioned to cut through a pipe, rotating axially on the roller means, in a cutting path having the same contour as the template, and
 the torch mounting has means to rotate the torch from a position lateral to the axis of a pipe on the roller means through an angle of at least 65° on each side of the lateral position while keeping the torch mouth at a substantially fixed position relative to a pipe on the roller means.

2. Apparatus according to claim 1 in which the roller means includes a drive system to rotate a pipe supported by the roller means.

3. Apparatus according to claim 2 in which the drive system for the roller means and the drive means for the boom are synchronized to obtain relatively uniform linear movement of the torch along its pipe cutting path.

4. Apparatus according to claim 2 in which the roller means is controllable as to the speed at which it rotates a pipe supported thereon independently of the boom horizontal speed.

5. Apparatus according to claim 1 in which the torch mounting includes means to move the torch longitudinally toward and away from a pipe.

6. Apparatus according to claim 1 in which the torch mounting includes a protractor to measure the torch angle from a position lateral to a pipe on the rollers.

7. Apparatus according to claim 6 in which the means to rotate the torch is manually operable.

8. A method of cutting the end of a pipe for intersection with another surface, comprising:
- placing a pipe on roller means to support and axially rotate it horizontally and parallel to a horizontally positioned and movable boom having a cutting torch movably supported by a mounting on the boom and a photocell scanner spaced from the torch;
- placing a template which is readable by the photocell scanner on and at least partially circumscribing the pipe;
- activating the roller means to rotate the pipe;
- automatically moving the boom horizontally and axially responsive to the photocell scanner tracing the template and simultaneously cutting the pipe with the torch in a path which is controlled by the template, and
- rotating the torch within an angle of about 25° to 155° with respect to the pipe axis as the pipe rotates, while keeping the torch mouth at a substantially fixed position relative to the pipe, to bevel the end of the pipe.

9. A method according to claim 8 in which the torch mounting includes a protractor to measure the torch angle from a position lateral to the pipe, the template has angle degree markings spotted around the template and the torch is rotated to angles corresponding with the angle degree markings as the pipe rotates and the torch cuts the pipe thereby beveling the pipe end.

10. A method according to claim 8 including guiding the torch to cut and bevel the pipe end so that it can contact said another surface approximately along the outside or inside edge of the end of the pipe wall.

11. Apparatus in combination comprising:
- a horizontally positioned and movable boom,
- roller means to support and axially rotate a horizontal pipe parallel to the boom,
- a photocell scanner mounted on the boom and positioned to follow a template circumscribing a pipe on the roller means,
- drive means, responsive to a signal from the photocell scanner, adapted to move the boom horizontally in either axial direction as the photocell scanner follows the template,
- a cutting torch movably supported by a mounting on the boom and positioned to cut through a pipe, rotating axially on the roller means, in a cutting path having the same contour as the template, and
- the torch mounting has means to rotate the torch from a position lateral to the axis of a pipe on the roller means through an angle which is within an angle of about 25° to 155° with respect to the pipe axis while keeping the torch mouth at a substantially fixed position relative to a pipe on the roller means.

* * * * *

UNITED STATES PATENT AND TRADEMARK OFFICE
CERTIFICATE OF CORRECTION

PATENT NO. : 4,219,370
DATED : August 26, 1980
INVENTOR(S) : Harold Baird Hoaglin et al.

It is certified that error appears in the above—identified patent and that said Letters Patent is hereby corrected as shown below:

Column 3, line 31, "11-11" should read -- 9-9 --.

Column 3, line 33, "12-12" should read -- 10-10 --.

Column 3, line 35, "13-13" should read -- 11-11 --.

Column 3, line 42, "16-16" should read -- 14-14 --.

Column 3, line 44, "17-17" should read -- 15-15 --.

Signed and Sealed this

Twentieth Day of January 1981

[SEAL]

Attest:

RENE D. TEGTMEYER

Attesting Officer

Acting Commissioner of Patents and Trademarks